US008630620B2

(12) United States Patent
Cha et al.

(10) Patent No.: US 8,630,620 B2
(45) Date of Patent: Jan. 14, 2014

(54) METHOD AND APPARATUS FOR SECURING LOCATION INFORMATION AND ACCESS CONTROL USING THE LOCATION INFORMATION

(75) Inventors: Inhyok Cha, Yardley, PA (US); Yogendra C. Shah, Exton, PA (US); Chunxuan Ye, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1471 days.

(21) Appl. No.: 12/019,755

(22) Filed: Jan. 25, 2008

(65) Prior Publication Data
US 2008/0182592 A1 Jul. 31, 2008

Related U.S. Application Data

(60) Provisional application No. 60/886,822, filed on Jan. 26, 2007.

(51) Int. Cl.
*H04M 3/16* (2006.01)
*H04M 1/00* (2006.01)
*H04B 1/38* (2006.01)
*H04W 24/00* (2009.01)
*H04K 1/00* (2006.01)
*H04L 9/32* (2006.01)

(52) U.S. Cl.
USPC ..... 455/411; 455/550.1; 455/558; 455/456.3; 380/247; 713/175; 713/176; 713/180

(58) Field of Classification Search
USPC ................. 455/558, 410–411, 456.1–457, 455/414.1–414.2, 550.1–551; 380/247–250; 713/175–176, 180
See application file for complete search history.

(56) References Cited

U.S. PATENT DOCUMENTS 6,295,454 B1 9/2001 Havinis et al.
7,039,422 B2 5/2006 Shah et al.
(Continued)

FOREIGN PATENT DOCUMENTS

CN 1747386 A 3/2006
EP 1 631 039 3/2006
(Continued)

OTHER PUBLICATIONS

Open Mobile Alliance (OMA)—Mobile Location Service Architecture, Draft Version 1.2—Dec. 7, 2006. http://member.openmobilealliance.org/ftp/Public_documents/LOC/Permanent_documents/OMA-AD-MLS-V1_2-20061207-D.zip.
(Continued)

*Primary Examiner* — Vladimir Magloire
*Assistant Examiner* — Michael Mapa
(74) *Attorney, Agent, or Firm* — Woodcock Washburn LLP

(57) ABSTRACT

A method and apparatus for securing location information and access control using the location information are disclosed. A wireless transmit/receive unit (WTRU) includes a location sensing entity and a subscriber identity module (SIM). The location sensing entity generates location information of the WTRU and the location information is embedded in a message in an SIM. A trusted processing module in the WTRU verifies integrity of the location information. The trusted processing module may be on the SIM. The location information may be physical location information or contextual location-related information. The trusted processing module is configured to cryptographically secure and bind the location information to the WTRU, and verify trust metrics of an external entity prior to granting an access to the location information or accepting information from the external entity. The trusted processing module may be a trusted computing group (TCG) trusted platform module (TPM) or mobile trusted module (MTM). The location information may be used for an authentication purpose or access control. The location information may be combined with time information.

54 Claims, 5 Drawing Sheets

(56) References Cited

U.S. PATENT DOCUMENTS

| | | | |
|---|---|---|---|
| 7,194,549 B1* | 3/2007 | Lee et al. | 709/238 |
| 7,203,967 B2 | 4/2007 | Chmaytelli et al. | |
| 7,512,973 B1* | 3/2009 | Chan et al. | 726/10 |
| 7,536,695 B2 | 5/2009 | Alam et al. | |
| 2002/0138650 A1* | 9/2002 | Yamamoto et al. | 709/245 |
| 2004/0193707 A1 | 9/2004 | Alam et al. | |
| 2004/0242195 A1* | 12/2004 | Chun et al. | 455/410 |
| 2005/0141450 A1* | 6/2005 | Carlton et al. | 370/329 |
| 2006/0046744 A1 | 3/2006 | Dublish et al. | |
| 2006/0068758 A1* | 3/2006 | Dharmadhikari et al. | 455/411 |
| 2006/0155988 A1* | 7/2006 | Hunter et al. | 713/164 |
| 2006/0236369 A1* | 10/2006 | Covington et al. | 726/1 |
| 2007/0002868 A1* | 1/2007 | Qian et al. | 370/395.21 |
| 2007/0025293 A1 | 2/2007 | Choi | |
| 2007/0067617 A1* | 3/2007 | Tarkkala | 713/2 |
| 2007/0266256 A1 | 11/2007 | Shah et al. | |

FOREIGN PATENT DOCUMENTS

| | | |
|---|---|---|
| GB | 2 413 744 | 11/2005 |
| JP | 2002-183188 | 6/2002 |
| JP | 2007-20031 | 1/2007 |
| RU | 2006111461 | 8/2006 |
| RU | 2358282 C2 | 6/2009 |
| WO | WO 03/067404 | 8/2003 |
| WO | WO 2005/026878 | 3/2005 |
| WO | WO 2006/118401 A2 | 11/2006 |
| WO | 2007/011416 | 1/2007 |
| WO | WO 2008/094452 | 8/2008 |

OTHER PUBLICATIONS

Open Mobile Alliance (OMA)—Location Architecture Overview Requirements, Draft Version 1.0—Oct. 20, 2004. http://member.openmobilealliance.org/ftp/Public_documents/LOC/Permanent_documents/OMA-RD-LOC_ArchOverview-V1_0_1-20041020-D.zip.

Open Mobile Alliance (OMA)—DRM Specification, Candidate Version 2.0—Jun. 14, 2005. www.openmobilealliance.org/release_program/docs/DRM/V2_0-20050614-C/OMA-TS-DRM-DRM-V2_0-.20050614-C.pdf.

3$^{rd}$ Generation Partnership Project; Technical Specification Group Services and System Aspects; "Functional Stage 2 Description of Location Services (LCS)" (Release 6); 3GPP TS 23.271 V6.13.0 (Sep. 2005).

3$^{rd}$ Generation Partnership Project; Technical Specification Group Services and System Aspects; "Functional Stage 2 Description of Location Services (LCS)" (Release 7); 3GPP TS 23.271 V7.7.0 (Dec. 2006).

3$^{rd}$ Generation Partnership Project; Technical Specification Group Services and System Aspects; "Functional Stage 2 Description of Location Services (LCS)" (Release 7); 3GPP TS 23.271 V7.9.0 (Sep. 2007).

IETF RFC3280 "Public Key Infrastructure" http://www.ietf.org/rfc/rfc3280.txt.

Sendonaris, A. et al. "User Cooperation Diversity—Part I: System Description", *IEEE Transactions on Communications*, vol. 51, Issue 11, Nov. 2003, pp. 1927-1938.

Sendonaris, A. et al. "User Cooperation Diversity—Part II: Implementation Aspects and Performance Analysis", *IEEE Tranasactions on Communications*, vol. 51, Issue 11, Nov. 2003, pp. 1939-1948.

TPM Main Part 1 Design Principles, Specification Version 1.2, Revision 85, Published, Feb. 13, 2005.

TCG Mobile Trusted Module Specification, Specification Version 0.9, Revision 1, Draft, Sep. 12, 2006.

TCG Specification Architecture Overview, Specification, Revision 1.2, Apr. 28, 2004.

TCG Mobile Phone Working Group—Use Case Scenarios—V2.7, 2005.

"Universal Mobile Telecommunications System (UMTS); Telecommunication management; Charging management; Location Services (LCS) charging (3GPP TS 32.271 version 6.2.6 Release 6)," ETSI TS 132 271 V6.2.0 (Sep. 2005).

3$^{rd}$ Generation Partnership Project; Technical Specification Group Services and System Aspects; "Functional Stage 2 Description Location Services (LCS)" (Release 6); 3GPP TS 23.271 V6.13.0 (Sep. 2005).

3$^{rd}$ Generation Partnership Project; Technical Specification Group Services and System Aspects; "Functional Stage 2 Description Location Services (LCS)" (Release 7); 3GPP TS 23.271 V7.7.0 (Dec. 2006).

3$^{rd}$ Generation Partnership Project; Technical Specification Group Services and System Aspects; "Functional Stage 2 Description Location Services (LCS)" (Release 7) 3GPP TS 23.271 V7.9.0 (Sep. 2007).

Jarumsombat et al., "Digital Signature on Mobile Devices based on Location," IEEE International Symposium on Communications and Information Technologies, pp. 866-870 (Oct. 2006).

Open Mobile Alliance (OMA)—DRM Specification, Candidate Version 2.0—Jun. 14, 2005. www.openmobilealliance.org/release_program/doc/DRM/V2_0-20050614-C/OMA-TS-DRM-DRM-V2_0-20050614-C.pdf.

Park et al., "A Secure and Privacy Enhanced LBS Security Elements Based on KLP," Proceedings of the IEEE International Geoscience and Remote Sensing Symposium, pp. 1221-1224 (Jul. 25-29, 2005).

Sendonaris, A. et al. "User Cooperation Diversity—Part II: Implementation Aspects and Performance Analysis", *IEEE Transactions on Communications*, vol. 51, Issue 11, Nov. 2003, pp. 1939-1948.

Third Generation Partnership Project, "Technical Specification Group Services and System Aspects; Functional stage 2 description of Location Services (LCS) (Release 6)," 3GPP TS 23.271 V6.13.0 (Sep. 2005).

Third Generation Partnership Project, "Technical Specification Group Services and System Aspects; Functional stage 2 description of Location Services (LCS) (Release 5)," 3GPP TS 23.271 V5.13.0 (Dec. 2004).

Third Generation Partnership Project, "Technical Specification Group Services and System Aspects; Functional stage 2 description of Location Services (LCS) (Release 1999)," 3GPP TS 23.271 V4.13.0 (Dec. 2004).

Third Generation Partnership Project, "Technical Specification Group Services and System Aspects; Location Services (LCS); Service description; Stage 1 (Release 8)," 3GPP TS 22.071 V8.0.0 (Dec. 2007).

Third Generation Partnership Project, "Technical Specification Group Services and System Aspects; Location Services (LCS); Service description; Stage 1 (Release 7)," 3GPP TS 22.071 V7.4.0 (Dec. 2005).

Third Generation Partnership Project, "Technical Specification Group Services and System Aspects; Location Services (LCS); Service description; Stage 1 (Release 6)," 3GPP TS 22.071 V6.7.0 (Mar. 2004).

Third Generation Partnership Project, "Technical Specification Group Services and System Aspects; Location Services (LCS); Service description; Stage 1 (Release 1999)," 3GPP TS 22.071 V3.5.0 (Mar. 2004).

Third Generation Partnership Project, "Technical Specification Group Services and System Aspects; Location Services (LCS); Service description; Stage 2 (Release 4)," 3GPP TS 22.071 V.4.6.0 (Mar. 2004).

Third Generation Partnership Project, "Technical Specification Group Services and System Aspects; Location Services (LCS); Service description; Stage 1 (Release 5)," 3GPP TS 22.071 V5.4.0 (Mar. 2004).

Third Generation Partnership Project, "Technical Specification Group Services and System Aspects; Functional stage 2 description of Location Services (LCS) (Release 7)," 3GPP TS 23.271 V.7.7.0 (Dec. 2006).

(56) References Cited

OTHER PUBLICATIONS

Third Generation Partnership Project, "Technical Specification Group Services and System Aspects; Functional stage 2 description of Location Services (LCS) (Release 7)," 3GPP TS 23.271 V7.9.0 (Sep. 2007).

Third Generation Partnership Project, "Technical Specification Group Services and System Aspects; Functional stage 2 description of Location Services (LCS) (Release 6)," 3GPP TS 23.271 V6.5.0 (Sep. 2003).

Third Generation Partnership Project, "Technical Specification Group Services and System Aspects; Telecommunication management; Charging management; Location Services (LCS) charging (Release 7)," 3GPP TS 32.271 V7.0.0 (Jun. 2007).

Third Generation Partnership Project, "Technical Specification Group Services and System Aspects; Location Services (LCS); Service description; Stage 1 (Release 6)," 3GPP TS 22.071 V6.5.0 (Sep. 2003).

Schneier, B. (Ed.), "Applied Cryptography: Protocols, Algorithms, and Source Code in C", Second Edition, Wiley, Oct. 18, 1996, p. 56.

McDonald, "Public Network Integrity—Avoiding a Crisis in Trust", IEEE Journal on Selected Areas in Communications, Jan. 1994, 12(1), 5-12.

Sheldon, "Encyclopedia of Networking, Electronic Edition", ISBN-0-07-882333-1, 1998, 3 pages.

\* cited by examiner

METHOD AND APPARATUS FOR SECURING LOCATION INFORMATION AND ACCESS CONTROL USING THE LOCATION INFORMATION

CROSS REFERENCE TO RELATED APPLICATION

This application claims the benefit of U.S. provisional application No. 60/886,822 filed Jan. 26, 2007, which is incorporated by reference as if fully set forth.

FIELD OF INVENTION

The present invention is related to wireless communication.

BACKGROUND

Location based services (LBS) is an emerging class of services that are provided based on the location(s) of wireless transmit/receive units (WTRUs) and their users. Various wireless communication standards, such as third generation partnership project (3GPP) and 3GPP2, define the network architectures supporting LBS at the application and service architecture level. Other groups, such as the open mobile alliance (OMA) location technical specification group, also define the service level architectures for LBS.

FIG. 1 illustrates the relation of location services (LCS) clients and servers in the core network with the GSM EDGE radio access network (GERAN) 120 and universal terrestrial radio access network (UTRAN) 130 access networks. The core network includes a gateway mobile location center (GMLC), (a requested GMLC (R-GMLC) 142, home GMLC (H-GMLC) 144, visited GMLC (V-GMLC) 146), a privacy profile register (PPR) 148, and other network nodes.

An LCS server is a network-based entity that serves location information to an LCS client and enforces access control and security policies in terms of location services. In the 3GPP centric architecture of FIG. 1, the various GMLC's correspond to the location services as defined above. As part of the service or operation, an LCS client, either one that resides inside, attached to, or embedded within a WTRU 110 (an internal LCS client 115), or one that resides external to the WTRU 110 (an external LCS client 150), may request the location information of the WTRU 110 to an LCS server, (i.e., GMLC). There may be more than one internal LCS client 115, more than one external LCS client 150 and more than one LCS server. A GMLC 142, 144, 146 contains functionality required to support LCS. In one public land mobile network (PLMN), there may be more than one GMLC. A GMLC is the first node an internal LCS client 115 or an external LCS client 150 accesses in a PLMN.

After performing registration authorization, the GMLC sends positioning requests to either mobile switching center (MSC), serving GPRS support node (SGSN) or MSC server, and receives final location estimates from the corresponding entity. Information needed for authorization, location service requests and location information may be communicated between GMLCs, located in the same or different PLMNs. The RGMLC 142 is the GMLC which receives the request from an LCS client. The HGMLC 144 is the GMLC residing in the target WTRU's home PLMN, which is responsible for the control of privacy checking of the target WTRU. The VGMLC 146 is the GMLC which is associated with the serving node of the target WTRU.

The PPR 148 stores privacy information of the WTRU 110. The PPR 148 executes privacy checks and sends the privacy check results to other network nodes. The PPR 148 is considered as an entity that is separate from, but supportive of, a 'location server' that is defined above, in that the PPR 148 provides the privacy (and access control or policy-related) information about the WTRUs for whom location services are sought.

Conventional methods of authentication and access control to a wireless network and/or applications and data on a WTRU and network servers have relied on techniques such as user authentication by single or multi-factor evidence, cryptographic message encryption and decryption, rule and behavior-based access control to network resources and/or device applications, and trust processing techniques that verify the applications and operating system's code integrity. Conventional methods have not considered the concepts and use of physical (geographical) and logical location information as a decision variable for access control and authentication.

Newer WTRUs have location and positioning capabilities as provided by technologies, such as a global positioning system (GPS), assisted GPS (A-GPS), or a wide area augmentation system (WAAS)). Various industry organizations, such as the 3GPP and GSM association (GSMA), have considered the use of LBS and specified requirements for such services. However, the prior art work have limited its focus on providing services that can be summarized as navigation systems, finding and tracking users, (e.g., tracking of fleets or children), objects, (e.g., nearest stores or restaurants), or resources, (e.g., phone service centers or nearest WiFi hotspots). In other words, the location information has been used as a factor of service-enablers but not as service limiters or service controllers. Accordingly, the prior art has not considered the usage of location information as a decision variable in access control and authentication.

In addition, in prior art, the location information is limited to the physical location of a WTRU. The prior art has not considered a more expanded definition of location information, such as proximity, enclosure, exclusion, referencing to trusted locations of known objects or entities.

Further, conventional methods have not considered how location-related components and information can be tied to the architectures of network services, devices, content and applications in a trusted manner. For example, location-reporting software for a GPS device attached to a WTRU may be compromised and may furnish false information about the physical location of the WTRU to a service provider. The service provider may then be spoofed to allow specific services that the WTRU should not have been allowed to have an access to if the WTRU had reported real, uncompromised location. Securing the measuring, reporting, storing, and processing of location information needs careful consideration.

Further, conventional methods have not sufficiently considered the use of location information in various mobile application processing, including digital rights management (DRM) and mobile payment, or the like, despite the fact that the location of the mobile device which wishes to conduct certain processing for network-based service application could become a valuable source of information that can be used to authenticate and securitize the application processing, if such information can be trusted and securely handled. For example, in conventional mobile DRM application protocols, (such as the OMA DRM 2.0 protocol), the use of secure location information as part of the device profile information or as part of the rights objects acquisition protocol (ROAP), has not been considered.

SUMMARY

A method and apparatus for securing location information and access control using the location information are disclosed. A WTRU includes a location sensing entity and a subscriber identity module (SIM). The location sensing entity generates location information of the WTRU and the location information is stored in the secure area of the SIM. A trusted processing module in the WTRU verifies integrity of the location information. The trusted processing module may be on the SIM. The location information may be physical location information or contextual location-related information. The trusted processing module is configured to cryptographically secure and bind the location information to the WTRU, and verify trust metrics of an external entity prior to granting an access to the location information or accepting information from the external entity. The trusted processing module may be a trusted computing group (TCG) trusted platform module (TPM) or mobile trusted module (MTM). The location information may be used for an authentication purpose or access control. The location information may be combined with time information.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
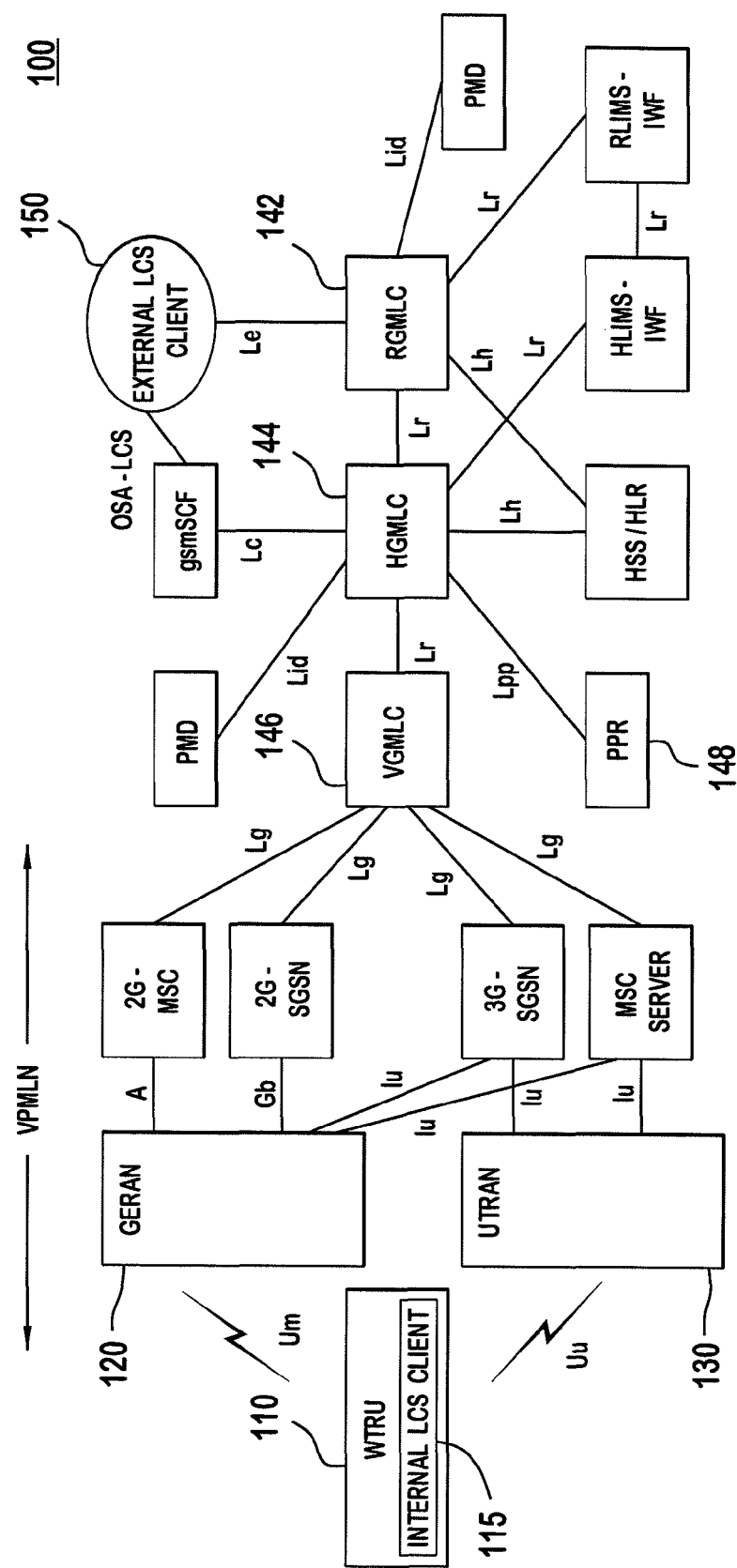
FIG. 1 illustrates the relation of LCS clients and servers in the core network with the GERAN and UTRAN access networks.
Figure 2:
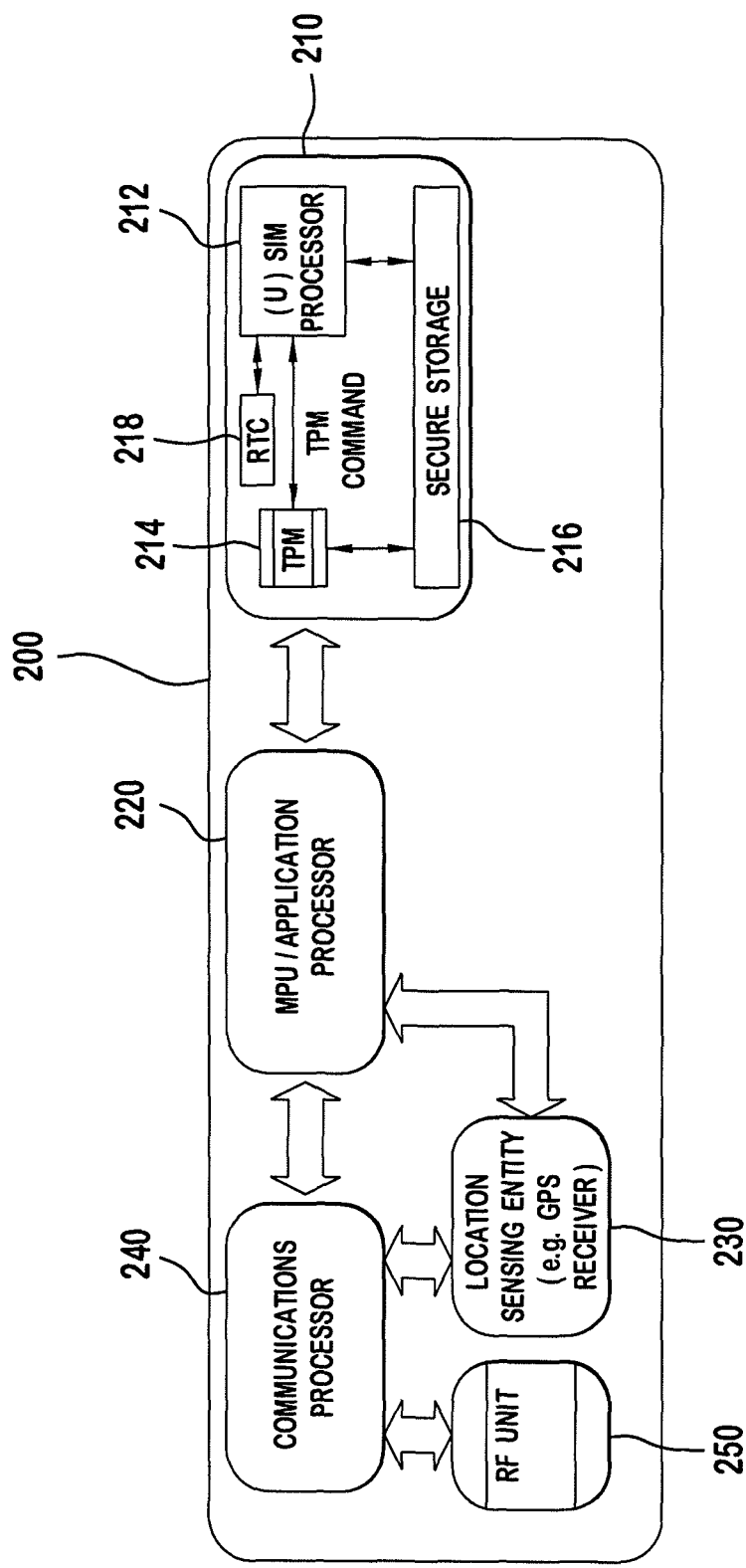
FIG. 2 is a block diagram of a WTRU including an expanded SIM.

FIG. 2 is a block diagram of a WTRU 200 including an expanded SIM 210. The WTRU 200 computes and reports an estimate of the current location information of the WTRU 200 in a secure, non-tampered way, upon request for such information from an LCS client, internal or external to the WTRU 200. The WTRU 200 includes an SIM 210 (or a universal SIM (USIM), hereinafter collectively as "SIM"), a micro processing unit (MPU)/application processor 220, a location sensing entity 230, a communications processor 240, and a radio frequency (RF) unit 250. Application programs (not shown in FIG. 2) such as those for the internal LCS client 115 are running on the MPU/application processor 220. There are also lower-level software (not shown in FIG. 2) running on the WTRU 200 to support the various hardware and application-layer software for the various entities on the WTRU 200 including but not limited to the MPU/application processor 220, the location sensing entity 230, the communication processor 240, the RF unit 250, and the SIM (or USIM) 210. The received signals are processed by the RF unit 250 and the communication processor 240. The location sensing entity 230 may be a hardware and/or software entity for sensing the location of the WTRU 200. For example, the location sensing entity 230 may be a GPS receiver and associated software.

The location sensing entity 230 may estimate, either on its own or by using assistance or direction from a network, physical or contextual location information of the WTRU 200. The physical location information is information about the WTRU's physical or geographical location, (e.g., measured in latitude and longitude, or address information, with or without altitude information, or the like). The contextual location information is logical or contextual information regarding the WTRU's physical location. For example, perimeter or boundary information in reference to another entity having geographical or contextual location information, (e.g., WTRU X is inside the boundary of a shopping mall, and WTRU Y is outside the boundary of a building). The contextual location information may be directional and/or distance relationship in reference to another entity having location information, (e.g., WTRU X is located 100 meters from WTRU Y, and WTRU Z is located 1 mile south-east of a base station W). The location information may be combined with secure time information to provide an additional parameter for control of access.

The SIM 210 holds a master secret used to identify the WTRU 200 and to provide authentication services to support the establishment of a secure channel between the WTRU 200 and a network. A root identity is held securely within the device and never divulged outside of the secure or trusted domain of the SIM 210.

The SIM 210 includes an SIM processor 212, a trusted platform module (TPM) 214 (or mobile trusted module (MTM)) (optional), a secure storage 216, and a real time clock (RTC) 218 (optional). The SIM processor 212 performs conventional SIM functions and may be extended to perform security related functions. The location sensing entity 230 processes signals from the communications processor 240 and outputs location information to the MPU/application processor 220. The location information is sent to the SIM 210. The SIM 210 also performs location stamping to messages, (e.g., authentication messages used for authentication procedures), and events or data, (e.g., data stored for applications that the SIM 210 may work on including DRM applications). The RTC 218 may output time information, and the time information may be combined with the location information. Alternatively, the RTC 218 may reside outside of the SIM 210 but may provide the same functionality as when it were inside the SIM 210. The location information or combined location-time information may be stored in the secure storage 216. Since the location information is embedded in the SIM, which is the most secure component in the WTRU, the location information may be considered to be secure, and may be used for access control, authentication, or other purposes, which will be explained in detail below. Alternatively, the location information may be stored outside of the SIM 210 but still under cryptographic protection by the TPM 214 that may reside either inside the SIM 210 or outside of the SIM 210.

The SIM 210 may also be implemented in software that runs on the MPU/application processor 220. In this case, the TPM 214 protects the integrity and authenticity of the whole or parts of the WTRU 200 such as the SIM 210 and its associated software, the MPU/application processor 220 and its associated software, and the like.

The TPM 214, (more generally trusted processing module) measures and assesses the integrity and trustworthiness of the platform and software of the WTRU 200 and may also assess the integrity and trustworthiness of external clients or their request to the WTRU 200 for location services. The TPM 214 also protects the security of the location information held either within the SIM 210 or outside of it but inside the WTRU 200. The TPM 214 and components for secure location (and time) and conventional SIM functional units may be integrated within one integrated circuit card (ICC). Alternatively, the TPM 214 may be located outside the SIM 210 within the WTRU 200 but may provide the same functionality as when it were inside the SIM 210.

The TPM 214 protects and provides the core root of trust for location functionality and trust measurement capability. The TPM 214 may work with, or under supervision of, the operating system and/or an application running on the MPU/Application processor 220 to verify trust metrics from an entity that requests the location information from the WTRU 200, and grant and control access to the location information only after verification of the requestor's trust metrics. The TPM 214 may work with, or under supervision of, the operating system and/or an application running on the MPU/Application processor 220 to request, collect, and verify trust metrics for the location sensing entity 230 prior to accepting the location information supplied by the location sensing entity 230. The TPM 214 may work with, or under supervision of, the operating system and/or an application running on the MPU/Application processor 220 to generate and maintain a secure audit log. Upon inspection of the secure audit log, an LBS operator may easily determine whether the security of the components on the WTRU 200 may be trusted continuously.

Figure 3:
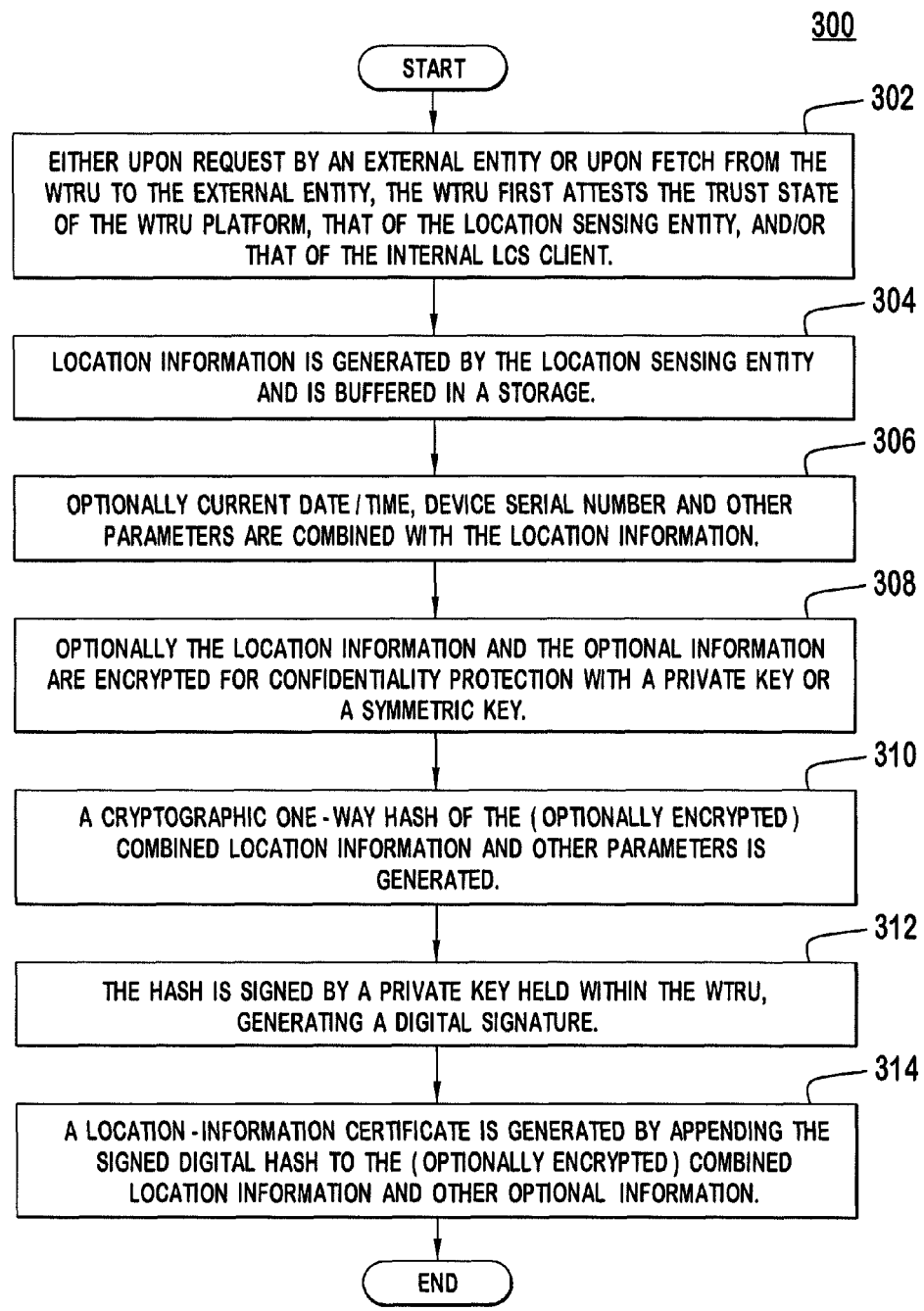
FIG. 3 is a flow diagram of an example process for providing the secured location information of the WTRU.

FIG. 3 is a flow diagram of an example process 300 for providing the secured location information of the WTRU 200. Either upon request by an external entity or upon fetch from the WTRU 200 to the external entity, the WTRU 200 may first attest (to either self or remotely to an external entity such as a location server) at least one of the "trust state" of the WTRU 200 platform, the trust state of the location sensing entity, and/or the trust state of the internal LCS client 115 (step 302), etc. Then the location information is generated by the location sensing entity 230 and is buffered in secure storage (step 304). Optionally, current date/time, device serial number, and other parameters may be combined with the location information (step 306). The location information, along with the optional information, is cryptographically bound to the WTRU 200 with a digital signature or through encryption, where the encryption key used is protected within the WTRU. The location information as well as the optional other information and parameters may also be encrypted for confidentiality protection using a private key of the WTRU or a symmetric key held within the WTRU (step 308). The generation, storage, retrieval, and/or use of the location information may also be bound to the integrity of the whole platform and/or any part of the WTRU 200 by use of trusted computing technologies, (i.e., by use of the TPM 214). A cryptographic one-way hash, (such as SHA-1, MD5, SHA-256, etc.), is generated from the (optionally encrypted) location information and any optional information (step 310). The hash is signed, (i.e., encrypted using a private key held within the WTRU 200, preferably stored within, or otherwise protected cryptographically by, the SIM 210 or a TPM 214), to yield a digital signature of the location information and optional other information (step 312). The hash operation is preferably performed within a secure execution environment such as within the SIM 210 or the TPM 214. Alternatively, such operation may also be performed by the MPU/application processor 220. A location certificate is generated by appending the signed digital hash, (i.e., the digital signature), to the (optionally encrypted) location information, (or the location information combined with other information) (step 314).

Alternatively, the location information may be provided during authentication procedures carried out to authenticate the WTRU to the Network. The location information is incorporated within the authentication messages, where it is protected by the message integrity check (MIC) of the authentication protocol. In this case, a digital certificate may not be required.

An external entity may verify the location certificate using the WTRU's public key. If the signature does not match, the location certificate is deemed invalid. The signature is verified by calculating a new hash from the location information extracted from the location information certificate. If the two hash values do not match, the external entity may assume that either the location certificate does not belong to that particular data record, or the data record has been altered. In either case, the external entity must deem the location certificate as being invalid. If verification succeeds then the location information is read from the location certificate and assumed to be trustworthy. The signed location certificate may be used as an undeniable proof of the location, that the data was notarized, and by the specific device used to generate the location certificate as identified by its unique serial number, or the like.

The use of hashing and digital signatures for the location certificate helps to secure the communication of the location information. The secure location component itself may be secure, but its output, (i.e., the location certificate that contains the location information), may be not once the location certificate is handled outside the secure location component. For example, the location certificate may be altered by an insecure program or tampered whilst stored in an insecure memory. Therefore, use of hashing and digital signing secures the location information in a verifiable way after the location information is provided by the secure location component.

The location sensing entity 230 and the location information may be calibrated and re-calibrated in accordance with a reliable, secure external location reference such as those provided by a network-based location server. For example, this may be carried out by enhancing the authentication procedure that is carried out securely within the SIM 210, or by implementing separate procedures within the SIM 210.

The WTRU 200 can also stamp a description of an event of interest to it or a part of it (such as the MPU/application processor 220) with location information where such a stamping of the event takes place. Such location stamping of an event may also include information of time when such location stamping takes place. In this case the stamping would be considered as location-time stamping.

Figure 4:
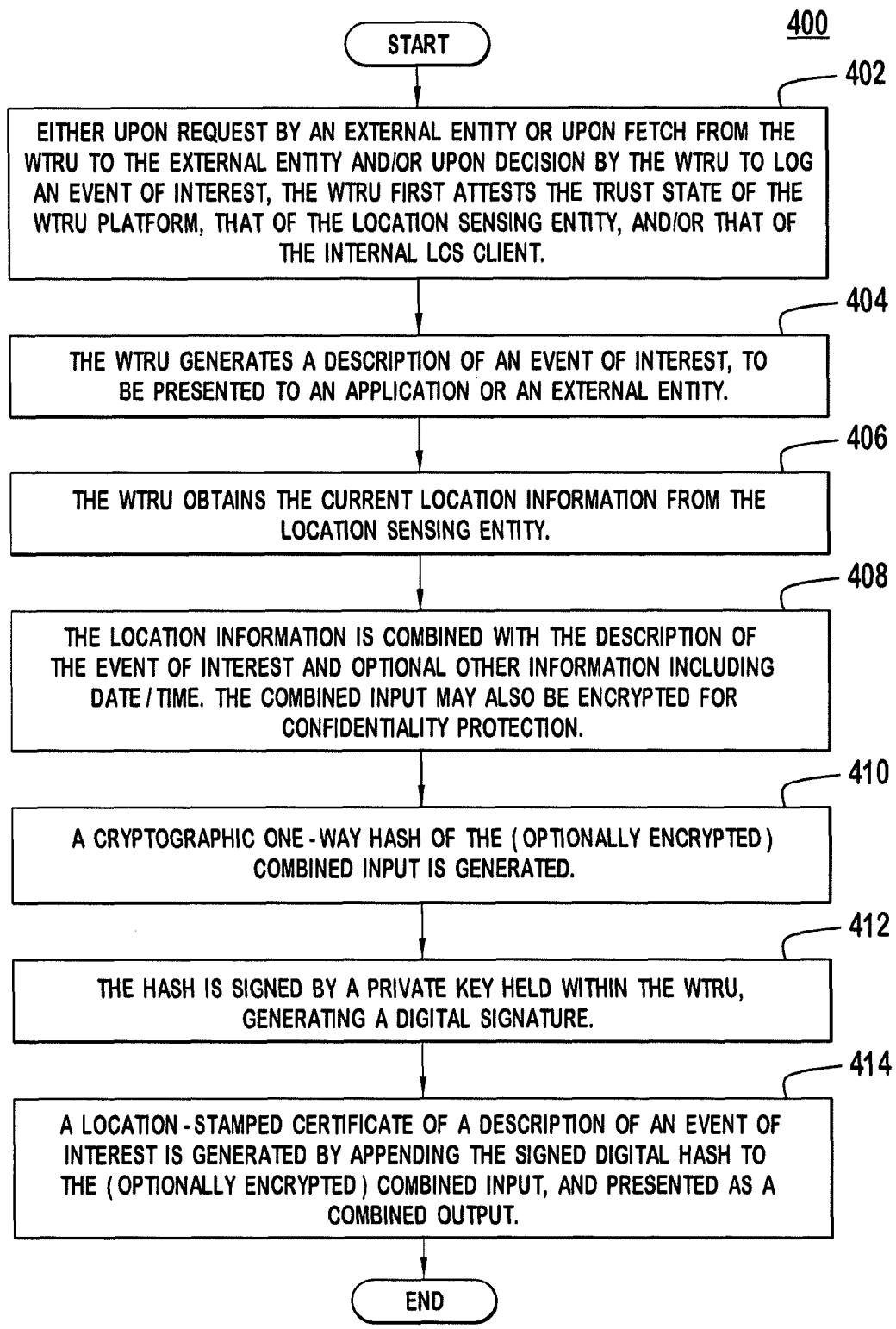
FIG. 4 is a flow diagram of an example process for providing a secured location (with or without time) stamp of an event of interest by the WTRU.

FIG. 4 is a flow diagram of an example process 400 for providing a secured location (with or without time) stamp of an event of interest by the WTRU 200 of FIG. 2. Either upon request by an external entity or upon fetch from the WTRU 200 or a part of it (such as the MPU/application processor 220) to the external entity and/or upon decision by the WTRU 200 or a part of it (such as the MPU/application processor 220) to log an event of interest, the WTRU 200 may first attest (to either self or remotely to an external entity such as a location server) at least one of the "trust state" of the WTRU 200 platform, the trust state of the location sensing entity, and/or the trust state of the internal LCS client 115, etc. (step 402). Then, a description of the event of interest is generated by the WTRU 200 or a part of it (such as the MPU/application processor 220) to be presented to an application or an external entity and is buffered in storage (step 404). Location information is freshly obtained from the location sensing entity 230 and is buffered in storage (step 406). The location information is combined with the description of the event of interest and optional other information including date/time or device serial number (step 408). If confidentiality protection is important, the description of the event, the location information, and any other optional parameters or descriptions, (such as date/time, serial numbers, etc.), may also be encrypted for confidentiality protection. Either an asymmetric private key or a symmetric key may be used for such encryption. Such encryption is preferably performed within the SIM 210 or the TPM 214. It may, however, be also performed by the MPU/application processor 220 (still in step 408). A cryptographic one-way hash of the (optionally encrypted) location-stamped description of the event of interest and optional other information is generated (step 410). The hash is signed by a key stored within the WTRU 200, generating a digital signature (step 412). Preferably such a key is preferably protected within the SIM 210 or within or outside cryptographically by the TPM 214. The hash operation is preferably performed within a secure execution environment such as within the SIM 210 or the TPM 214. Alternatively, such operation may also be performed by the MPU/application processor 220. Either a symmetric key or a public-private key pair may be used for the signing, although it is preferred to use a private key for such signing. A location-stamped certificate of a description of an event of interest is generated by appending the signed digital hash, (i.e., the digital signature), to the (optionally encrypted) location-stamped description of the event and presented as a combined output (step 414). Such output is called the location-stamped certificate of a description of an event. The location-stamped certificate of a description of an event may also either include within itself, or be accompanied by, a certificate that includes a public key that can be used for decrypting the signed signature, which is then appended to the location certificate.

Alternatively, the location information may be provided during the procedure for authentication of the WTRU to a cellular network. The location information is incorporated within the authentication messages, where it is protected by the message integrity check (MIC) of the authentication protocol. In this case, a digital certificate may not be required.

The WTRU 200 or an external network entity such as location server may also store and track a number of last locations where successful authentication takes place. Such history of the locations of successful authentication may be used by some applications on the WTRU 200 or on the location server.

An external entity may verify the location certificate using the WTRU's public key. If the signature does not match, the location certificate is deemed invalid. The digital signature appended in the signed location certificate is verified by calculating a new hash from the location information certificate. If the two hash values do not match, the external entity may assume that either the location certificate does not belong to that particular data file, or the data file has been altered. In either case, the external entity must deem the location certificate as being invalid. If both verifications succeed, the location information is read from the location certificate and assumed to be trustworthy. The signed location certificate may be used as an undeniable proof of the location, that the data was notarized, and the specific device used to generate the location certificate as identified by its unique serial number, or the like.

The use of hashing and digital signatures for the location certificate secures the location information. The secure location component itself may be secure, but its output, (i.e., the location certificate that contains the location information), may be not once the location certificate is handled outside the secure location component. For example, the location certificate may be altered by an insecure program or tampered whilst stored in an insecure memory. Therefore, use of hashing and digital signing secures the location information in a verifiable way after the location information is provided by the secure location component.

Fields may optionally be included with the location information to indicate the last time when the accuracy of the location measurement from the location sensing entity was checked with a trusted third party, (e.g., secure location server), and the last time when the location sensing entity was re-calibrated. These fields may be used by the applications to trigger re-calibration procedures, alert to the tamper condition, or the like.

Some of the conventional techniques may be used in conjunction with the security mechanism disclosed above to strengthen the security of the operations. Cryptographic digital signature algorithms, (such as digital signature standard (DSS), RSA, NTRU, or the like), may be used so that each device has its own unique private key used to sign the certificates. A tamper resistance mechanism may also be used to detect and prevent external signal probing, sniffing, power analysis, etc. in order to discover the internal operations and keys or to attempt modification of the functionality. Secure storage or E-Fuse boxes may be used to securely store the device ID, device serial number, device-specific secret keys, and other secret information in protected hardware thus providing for cryptographic device identification.

Hardware-protected keys may also be used. A device-unique key used for location certificate signing is generated within the tamper resistant hardware and never exposed externally. Thus, no unauthorized entity may ever decipher the value of the private key without defeating the hardware tamper resistance features.

A software-protection mechanism may also be used. If the key is generated by software running on general purpose hardware (without hardware tamper resistance), then the key may be protected via a combination of portable crypto devices, (smart cards, dongles, etc.), software tamper resistance, and/or code obfuscation with embedded split-keys (to ensure that the entire private key is never completely exposed in memory at any time).

A cryptographic random number generator (RNG) may also be used to generate an anti re-play "nonce" to append to the data input, to generate cryptographically harder-to-crack hash outputs, to counter attacks such as a re-play attack, birthday attack, and dictionary attacks.

Secure authentication of the public key (that is used to verify the signature) may also be performed so that a forged public key that may have been distributed cannot perform a fake verification of forged location certificates.

Once the location information of the WTRU or a location-stamped description of an event of interest is provided to a network, in a secure manner, the location information or location-stamped description of an event of interest may be used to control authentication of the WTRU 200 (and/or the user) and to control access to certain applications, service, data, functions, etc. of the WTRU 200 or the network to which the WTRU 200 is connected.

A secure location server, (e.g., GMLC), is a network-based server that, upon request by a client on the network, securely provides a reference location to the requesting client over the network. The secure location server may use a secure network-based location synchronization protocol. The location server is a trustworthy network component which maintains location information. The PPR 148 is another network-based server that provides information about the privacy and access control for the WTRU's and/or policies about handling this information and other security-related information. The location server enforces any privacy or security policies it obtains from the PPR 148.

Figure 5:
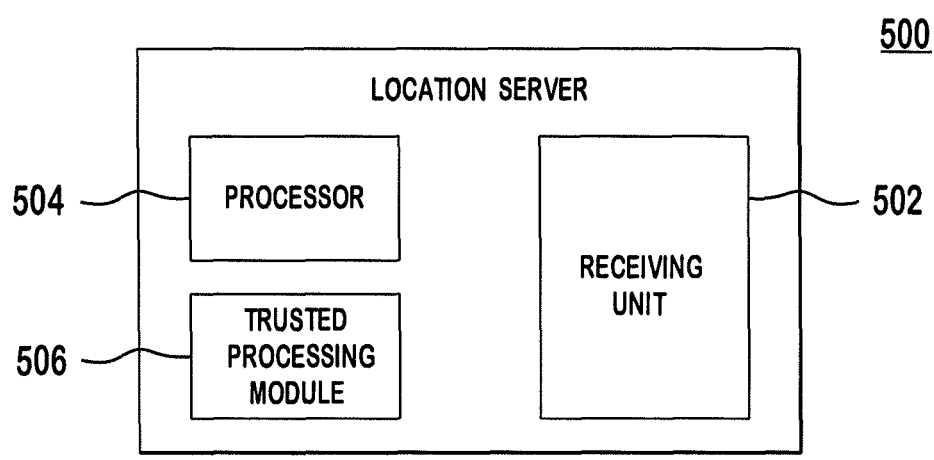
FIG. 5 is a block diagram of an example location server.

FIG. 5 is a block diagram of an example location server 500. The location server includes a receiving unit 502, a processor 504, and a trusted processing module 506 (optional). The receiving unit 502 receives trusted location information of the WTRU 200. The processor 504 performs numerous functions disclosed below including authentication and access control based on the location information. The trusted processing module measures the integrity and trust of the platform and software.

The processor 504 may correlate the location information to a set of contextual location information. The contextual location information may be an indicator whether the WTRU's current position is within or near (and how near) the location of a known object, where the location of such an object is considered as trusted and such trust relationship is recognized by both the WTRU 200, the location server, and the PPR 148. The contextual location information may be an indicator where the WTRU's future position may be, at a user or network-designated future time, either as an absolute geographical location or as a relative location to known objects or reference points.

The processor 504 may have capabilities and functions to generate, securely store, update, and propagate to WTRUs a policy which, having originated from the PPR 148 and been obtained by the location server for enforcement and/or transit, that governs how location-based information can be used internally by the WTRU 200 or its internal LCS client 115 to govern certain access rights, (e.g., access, on both an access-grant/deny basis and also a graded-access-grant basis, by an application on the WTRU 200, to access certain data, memory areas, or other applications, or access, on both granted/denied basis and a grading basis, by the human user, to certain applications on the WTRU 200 or provided by the network). The location server also has capabilities and functions to enforce such a policy. The location server may directly enforce the policy, or indicate to the WTRU 200 to self-regulate such access control.

The processor 504 may have capabilities and functions to govern the QoS level of services provided to each WTRU 200 based (either wholly or partially) on its location in a multicast situation.

The processor 504 and/or the trusted processing module 506 may have capabilities and functions to assess the trustworthiness (integrity and confidentiality) of location information. The verification may be performed by cross-checking with the PPR 148 in the network. The PPR 148 may have capabilities and functions to receive, from a location server, information on geographical location and contextual location information about the WTRU 200, and verify the integrity and accuracy of such data, and report the verification results back to the location server in a secure manner. The verification of the trustworthiness of the location information may alternatively be checked by the location server 500 itself.

The processor 504 may have capabilities and functions to verify, upon receipt of the location information from the WTRU 200, its true location by a supplemental location-measurement method that is independent of the WTRU's own mechanism of location determination and reporting. For example, a method of using three or more distance-measuring wireless access points for determining a WTRU's location in an independent way that is disclosed in U.S. patent application Ser. No. 11/283,017 entitled "Method and System for Securing Wireless Communications", which is incorporated by reference as if fully set forth, which may be used for this purpose.

The trusted processing module 506 may have capabilities and functions to verify the attestation sent by a WTRU 200 of its credibility, measured in terms of the integrity of certain information where such information cryptographically binds the WTRU's location information to the integrity of its software, operating system, or secret data. The trusted processing module 506 may be capable of conducting trust-computing processing, for example, by use of Trusted Computing Group (TCG) Trusted Network Connect (TNC) technologies.

The processor 504 and/or the trusted processing module 506 may also have capabilities and functions to securely communicate the location information with WTRU(s), other location server(s), and PPR(s), where security is ensured at both transport level and application level.

The processor 504 may also have capabilities and functions to provide service such as location-based access control (including authentication), location-based network routing and transport control, location-based service control (including service access control), and provisioning WTRUs with location-based access control policies.

The processor 504 may also have capabilities and functions for location-time-stamping. For example, the processor 504 may furnish to WTRUs, other location servers, or PPRs 148 secure data that comprises a location-time-stamp of particular events or data of interest. The processor 504 may verify, upon receipt, the integrity and accuracy of location time stamp data.

The processor 504 may also have capabilities and functions to securely manage cryptographic keys that are used in location-based access control procedures and policy management processes.

As stated above, the location information, (physical and contextual), of the WTRU 200 may be used to allow, disallow, or control access to data or applications by the WTRU's operation system or applications, its human user, peer mobile devices (that may try to access a particular WTRU's applications in a cooperative network setting), or entities on the network, (e.g., remote application provider or other service providers). For example, access to DRM content may be allowed only when a WTRU 200 is within a certain region. An access to corporate networks may be allowed only when a WTRU 200 is within a secure environment determined by the location information.

The location information may also be utilized to estimate velocity or speed dynamics of the WTRU 200 so as to extract additional parameters which may be used to guide the control of information in the WTRU 200. For example, access to a localized hot spot service may be allowed when a WTRU 200 is in the vicinity of the hot spot. In this case, the location and speed of the WTRU 200 may be used to prepare for the hot spot service provisioning between the WTRU 200 and the network. The location sensing entity on the WTRU 200 and the location information generated by the location sensing entity are secure, and thus any velocity or directional information generated thereof can be considered secure.

In an ad hoc network or mesh network, the location information may be used as a means for an efficient network routing decision. In a highly mobile network, (such as the localized wireless networks used for vehicular communications), the location information may be used to provide for dynamic routing decisions since the network may be continually morphing as vehicles enter and exit the local network at a high frequency. This may be used for vehicular safety systems when communications take place not only between vehicles but also with fixed nodes, such as traffic lights at a road intersection, etc.

The trusted location information of WTRUs may be integrated to trusted location information of known objects and location-based services may be provided based on this information. This method may be called trusted location object tagging (TLOT). If a database of a larger number of objects is available to LBS network operators, the database may be used by the LBS network operator to provide various location-based services. The locations of the objects in the database may be fixed or mobile but only on a very slow and recognizable basis. The location of such objects may be tracked over time, and geographic location attributes, (e.g., longitude, latitude, and altitude information), and contextual location attributes, (e.g., "this is a federal security complex", "this is a non-smoking cafeteria," etc.), are mutually cross-correlated in both directions, (i.e., geo-mapping and inverse-geo-mapping is supported in the database). Examples of the known objects may be buildings, landmarks, or any other geographic objects, (e.g., rivers, ponds, mountains, deserts, roads, dams, etc.).

For example, when the position of a WTRU 200 is determined to be close to a building with known WiFi security vulnerabilities, the operator may provide an access control service to disapprove WiFi access to the WTRU 200 unless the WTRU 200 or its user can provide appropriate authentication and other security proofs.

Additionally, the WTRU 200 may also store and utilize the TLOT information. For example, when the WTRU 200 may utilize its current knowledge of its location (obtained, for example, from the location sensing entity 230) to exercise access control or to initiate or request certain location-based service after it correlates its current location to any known or expected TLOT information of objects whose location is tagged in trusted ways.

Routing of data based on the location is possible. For example, if a WTRU 200 is determined to be within a building that is known to have certain different classes of routing capability, the WTRU 200 may be directed to use particular (wireless) routers but not others for its wireless communications within the building.

Many mobile applications, such as DRM or mobile payment, may benefit in terms of further security in the application protocol by use of secure location information in the protocols. For example, in OMA DRM, a DRM device, (e.g., a WTRU), uses a local measurement of location from its internal LCS client in all of the rights object acquisition protocol (ROAP) request sub-protocols. Upon receipt of the device location, the network DRM service provider uses the location information to determine the validity and appropriateness of such a request.

The trusted location information enabled by the methods disclosed above or location-time information may be included in the protocol messages. The recipient of such information is able to use such information to further the accuracy of the verification of the appropriateness of processing requested or performed by the WTRU 200.

Table 1 shows a ROAP rights object (RO) request message format including location information, (and optionally time information). The ROAP RO request message is sent by a DRM device, (e.g., WTRU), to a DRM rights issuer (RI) in order to request an RO for a DRM content that the DRM device wishes to consume. The conventional ROAP RO request message does not contain location information (or time information) of the WTRU 200 that is requesting the RO. In the modified ROAP RO request message, the location information of the current location of the WTRU 200 (and optionally time information) is included (shown in bold in Table 1), and the location information may be used at the rights issuer to assess whether and how to grant issuance of a RO to the requesting WTRU 200.

TABLE 1

| Parameter | Mandatory/Optional | Notes |
| --- | --- | --- |
| Device ID | M | Identifies requesting Device |
| Domain ID | O | When present, identifies the Domain |
| RI ID | M | Authorizing RI ID. Same value as in Registration Response |
| Device Nonce | M | Nonce chosen by Device. |
| Request Time | M | Secure DRM Time, as furnished by the Secure Time Component (STC) onboard the mobile DRM device |
| RO Info | M | Id's of the requested RO('s), also optional hash of DCF |
| Current Location | M | Current location of the RO-requesting mobile DRM device, as furnished by the Secure Location Component (SLC) onboard the mobile DRM device |
| Certificate Chain | O | Sent unless RI Context indicates Dev has necessary certificate information. Must include Dev Certificate |
| Extensions | O | Peer Key Identifier; No OCSP Response; OCSP Responder Key Identifier; Transaction ID |
| Signature | M | SHA-1 signature of (RO request message - Signature element) |

The current location information presented by the WTRU 200 to a RI may be assessed by the RI to verify the validity of the claimed location of the WTRU 200 through a third-party verifier, such as the previously described location server, and/or to use the location information for making decisions on whether and how grants to the RO should be made for the WTRU 200.

Similar modifications may be made for other ROAP-related messages including, but not limited to, Device Hello, RI Hello, Registration Request, Registration Response, RO Response, Join Domain Request, Join Domain Response, Leave Domain Request, and Leave Domain response messages, in order to enable location information-based control of DRM usage. Similar modifications of conventional protocols and related message formats are also possible to allow use of the location information for authentication of devices in other DRM use cases, such as storage of DRM contents from the WTRU 200 to an off-device storage device, or super-distribution of content between peer mobile DRM devices.

The location information may be used to supplement conventional authentication procedures for the WTRU 200 by augmenting conventional authentication procedures with location information for other applications, such as single sign on (SSO) and federated ID applications.

The trusted location information of WTRUs available at a base station, other network nodes such as wireless local area network (WLAN) access points, or a location server, is useful in a cooperative network. In a cooperative network, some WTRUs may serve as helpers to transmit data to other WTRUs for the base station, or transmit data to the base station for other WTRUs. This operation makes full use of spatial diversity to improve the network performance. Another advantage of the cooperative network is to extend coverage. With the knowledge of WTRUs' locations in a secure manner, the base station, (or the location server or any other network entity), may identify the WTRUs in the appropriate locations, and ask for the help from those WTRUs in the data transmissions, as well as in other functionalities.

Another application of the location information is multicast. Where a base station provides a service to multiple WTRUs, some WTRUs staying far from the base station are not expected to receive a high quality of service (QoS). Based on WTRU's locations (as well as other channels information), the base station may decide the level of QoS for each WTRU. This may save network bandwidth. For example, the base station may decide not to retransmit some data to a remote WTRU, which has not received that data, if the base station knows based on trusted location information of the WTRU that with a high probability the WTRU will miss the data again due to its location.

In the above two examples, (i.e., formation of co-operative networks, and determining QoS levels in a multicast situation), the wireless network may have access to information or measurements that may have more direct relevance as a determining metric other than the location information. For example, if a base station has a direct two-way communication link to all WTRUs in its cell, the base station would normally have access to all the RF channel link quality metrics, (e.g., signal to noise ratio (SNR)), with all the WTRUs within the cell. Such measures may be more directly useful than just location information as a determinant for formation of cooperative networks or multi-cast QoS levels. However, where a base station does not have the bandwidth to maintain a two-way link with all WTRUs within the cell, but can maintain a two-way link with one of the WTRUs which can also act as a collector and sender of location information about several other WTRUs, the base station may use the location information about all the WTRUs from the collector and sender WTRU in determining multicast QoS levels or the boundary of a cooperative network.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a processor;
a location sensing entity configured to generate location information of the WTRU; and
a trusted processing module configured to ensure integrity of the location information and the location sensing entity, wherein the trusted processing module is configured to ensure the integrity of the location sensing entity by checking the integrity of trust metrics associated with the location sensing entity, and
wherein the WTRU is configured to:
use the location sensing entity to generate the location information if the integrity of the location sensing entity is verified;
use the location information to generate a digital signature; and
append the digital signature, generated from the location information, to the location information.

2. The WTRU of claim 1 wherein the trusted processing module is configured to bind the location information to data using a certificate and output the certificate to a component outside of the WTRU.

3. The WTRU of claim 1 wherein the trusted processing module is configured to bind the location information to platform integrity data.

4. The WTRU of claim 1 wherein the trusted processing module is configured to bind the location information to application integrity data.

5. The WTRU of claim 1 wherein the trusted processing module is configured to bind the location information to a message with a message integrity check.

6. The WTRU of claim 1 wherein the trusted processing module is one of a trusted computing group (TCG) trusted platform module (TPM) or a mobile trusted module (MTM).

7. The WTRU of claim 1 wherein the trusted processing module is configured to verify trust metrics of an external entity intended to receive the location information prior to granting the external entity an access to the location information or accepting information from the external entity.

8. The WTRU of claim 1 wherein the trusted processing module is embedded in a subscriber identity module (SIM).

9. The WTRU of claim 1 wherein a subscriber identity module (SIM) is implemented in software whose integrity is protected and verified by the trusted processing module.

10. The WTRU of claim 1 wherein the location sensing entity is bound to a subscriber identity module (SIM) by the trusted processing module.

11. The WTRU of claim 1 wherein the location information is provided to a network for an authentication purpose.

12. The WTRU of claim 11 wherein a subscriber identity module (SIM) is configured to include the location information in a message with a message integrity check and configured to be sent during an authentication procedure.

13. The WTRU of claim 1 wherein the location sensing entity is calibrated in accordance with reference provided by a secure, trustworthy third party.

14. The WTRU of claim 1 wherein the location information is used by one of a digital rights management (DRM) application or a mobile payment application.

15. The WTRU of claim 1 wherein the location information is included in a digital rights management (DRM) data exchange protocol message.

16. The WTRU of claim 1 further comprising:
a real time clock (RTC) for outputting time information, wherein the time information is combined with the location information.

17. A method for securing location information, the method comprising:
receiving trust metrics associated with a location sensing component;
verifying an integrity of the location sensing component by using a trusted processing module to verify the trust metrics associated with the location sensing component;
verifying trust of platform and software in a wireless transmit/receive unit (WTRU);
generating location information of the WTRU if the integrity of the location sensing component and the trust of platform and software are verified;
generating a digital signature using the location information; and
appending the digital signature, generated from the location information, to the location information.

18. The method of claim 17 further comprising:
embedding the location information in a message; and
transmitting the message.

19. The method of claim 17 wherein the integrity is verified using one of a trusted computing group (TCG) trusted platform module (TPM) or a mobile trusted module (MTM).

20. The method of claim 17 further comprising:
performing an access control based on the location information.

21. The method of claim 18 wherein the message is sent during an authentication procedure.

22. The method of claim 17 further comprising:
calibrating the location sensing component in accordance with a reference provided by a secure, trustworthy third party.

23. The method of claim 17 further comprising:
verifying trust metrics of an external entity intended to receive the location information prior to granting the external entity an access to the location information or accepting information from the external entity.

24. The method of claim 17 wherein the message is a digital rights management (DRM) data exchange protocol message.

25. The method of claim 17 wherein the location information is used by a mobile payment application.

26. The method of claim 17 further comprising:
generating time information; and
combining the time information with the location information.

27. A method of utilizing secured location information of a wireless transmit/receive unit (WTRU), the method comprising:
obtaining location information of a WTRU, wherein the location information is indicative of an integrity of a location sensing component in the WTRU that has been verified using a trusted processing module to verify trust metrics associated with the location sensing component before the location information is generated and obtained, wherein the location information is further indicative of trust of platform and software in the WTRU that has been verified before the location information is generated and obtained;
determining a digital signature, comprising the location information, that is appended to the location information; and
providing a service based on the location information and verification of the digital signature.

28. The method of claim 27 wherein an access control on the WTRU applications and resources is performed based on the location information.

29. The method of claim 27 wherein an access control for data and services from a network is performed based on the location information.

30. The method of claim 27 wherein a trust state of the WTRU is validated locally before making a location measurement and performing location based processes.

31. The method of claim 27 wherein a trust state of the WTRU is validated remotely before making a location measurement and performing location based processes.

32. The method of claim 27 wherein the integrity and trust are verified by using one of a trusted computing group (TCG) trusted platform module (TPM) or a mobile trusted module (MTM).

33. The method of claim 27 further comprising:
performing authentication of the WTRU using the location information.

34. The method of claim 27 further comprising:
estimating a speed of the WTRU using the location information, wherein the speed is used as a parameter for an access control policy.

35. The method of claim 27 wherein a routing decision for the WTRU is made based on the location information.

36. A location server for supporting location-based service, the location server comprising:
a receiving unit configured to obtain location information of a wireless transmit/receive unit (WTRU), wherein the location information is indicative of an integrity of a location sensing component in the WTRU that has been verified by using a trusted processing module to verify trust metrics associated with the location sensing component before the location information is generated and obtained, and wherein the location information is further indicative of trust of platform and software in the WTRU that has been verified before the location information is generated and obtained; and
a processor configured to:
determine a digital signature, comprising the location information, that is appended to the location information; and
provide a service based on the location information and verification of the digital signature.

37. The location server of claim 36 wherein an access control on applications and resources of the WTRU is performed based on the location information.

38. The location server of claim 36 wherein an access control for data and services from a network is performed based on the location information.

39. The location server of claim 36 wherein the processor is configured to perform authentication of the WTRU using the location information.

40. The location server of claim 36 wherein the processor is configured to estimate a speed of the WTRU using the location information, wherein the speed is used as a parameter for an access control.

41. The location server of claim 36 wherein the processor is configured to make a routing decision for the WTRU based on the location information.

42. The location server of claim 36 wherein the processor is configured to control a quality of service (QoS) level provided to the WTRU based on the location information.

43. The location server of claim 36 wherein the processor is configured to verify attestation sent by the WTRU of its credibility.

44. The location server of claim 43 wherein the credibility is measured in terms of integrity of information that cryptographically binds the location information to the integrity of at least one of software, an operating system, or secret data.

45. The location server of claim 36 wherein the processor is configured to instruct the WTRU to forward data to a designated entity for cooperative distribution based on the location information.

46. A method for generating a location information certificate, the method comprising: receiving trust metrics associated with a location sensing entity; verifying the integrity of the location sensing entity by using a trusted processing module to verify the trust metrics associated with the location sensing entity; generating location information of a wireless transmit/receive unit (WTRU) if the integrity of the location sensing entity is verified; generating a cryptographic one-way hash using the location information; digitally signing the cryptographic one-way hash with a private key held within the WTRU; and generating a location certificate by appending the digitally signed hash to the location information.

47. The method of claim 46 further comprising:
encrypting the location information for confidentiality protection.

48. The method of claim 46 further comprising:
attesting at least one of a trust state of the WTRU platform, a trust state of the location sensing entity of the WTRU, or a trust state of an internal location service (LCS) client.

49. The method of claim 46 wherein a description of an event of interest is combined with the location information.

50. A wireless transmit/receive unit (WTRU) for generating a location information certificate, the WTRU comprising:
a processor;
a location sensing entity configured to generate location information of the WTRU; and
a trusted processing module configured to generate a cryptographic one-way hash using the location information, digitally sign the cryptographic one-way hash with a private key held within the WTRU, and generate a location certificate by appending the digitally signed hash to the location information, wherein the trusted processing module is further configured to ensure the integrity of the location sensing entity by checking the integrity of trust metrics associated with the location sensing entity, and wherein the WTRU is configured to use the location sensing entity to generate location information if the integrity of the location sensing entity is verified.

51. The WTRU of claim 50 wherein the location information is encrypted for confidentiality protection.

52. The WTRU of claim 50 wherein the trusted processing module is configured to attest at least one of a trust state of the WTRU platform, a trust state of the location sensing entity of the WTRU, or a trust state of an internal location service (LCS) client.

53. The WTRU of claim 50 wherein credibility is measured in terms of integrity of information that cryptographically binds the location information to an integrity of at least one of software, an operating system, or secret data.

54. The WTRU of claim 50 wherein a description of an event of interest is combined with the location information.

\* \* \* \* \*